United States Patent
McInnis

[11] 3,727,630
[45] Apr. 17, 1973

[54] NON-LEAK VALVE OF PLASTIC CONSTRUCTION

[76] Inventor: Andrew M. McInnis, 3601 Rancho Del Monico, Covina, Calif. 91722

[22] Filed: June 14, 1971

[21] Appl. No.: 152,892

[52] U.S. Cl. ............................................. 137/218
[51] Int. Cl. ......................................... F16k 45/00
[58] Field of Search .................. 137/218; 251/368

[56] References Cited

UNITED STATES PATENTS

| | | |
|---|---|---|
| 2,604,113 | 7/1952 | Barsano................................137/218 |
| 2,133,804 | 10/1938 | Brooks...................................137/218 |
| 3,298,396 | 1/1967 | Gressman et al. ..................251/368 X |
| 3,454,032 | 7/1969 | Hinz et al. ............................137/218 |
| 3,550,902 | 12/1970 | Pidgeon.............................251/368 X |

FOREIGN PATENTS OR APPLICATIONS

| | | |
|---|---|---|
| 527,201 | 10/1940 | Great Britain.......................137/218 |

*Primary Examiner*—Henry T. Klinksiek
*Attorney*—White, Haefliger and Bachand

[57] ABSTRACT

A valve of plastic construction, adapted for manual or automatic operation comprises, in combination,
  a. a molded plastic chamber including a body and a cap removably carried thereby, there being an annular main seat in the body and a chamber outlet from the body,
  b. a stem projecting generally coaxially through the seat with clearance therefrom, and toward the cap at one side of the seat,
  c. a stopper carried by the stem to engage and disengage the seat at the opposite side thereof in response to axial bodily displacement of the stem,
  d. structure carried by the cap and carrying the stem to effect said displacement thereof, and
  e. the chamber having a liquid pressure inlet to communicate said pressure to the stopper for transmitting pressure loading to the seat when the stem is displaced with consequent engagement of the stopper against the seat, whereby the stopper will remain closed against the seat irrespective of liquid pressure or temperature change induced expansion or contraction of the housing.

10 Claims, 6 Drawing Figures

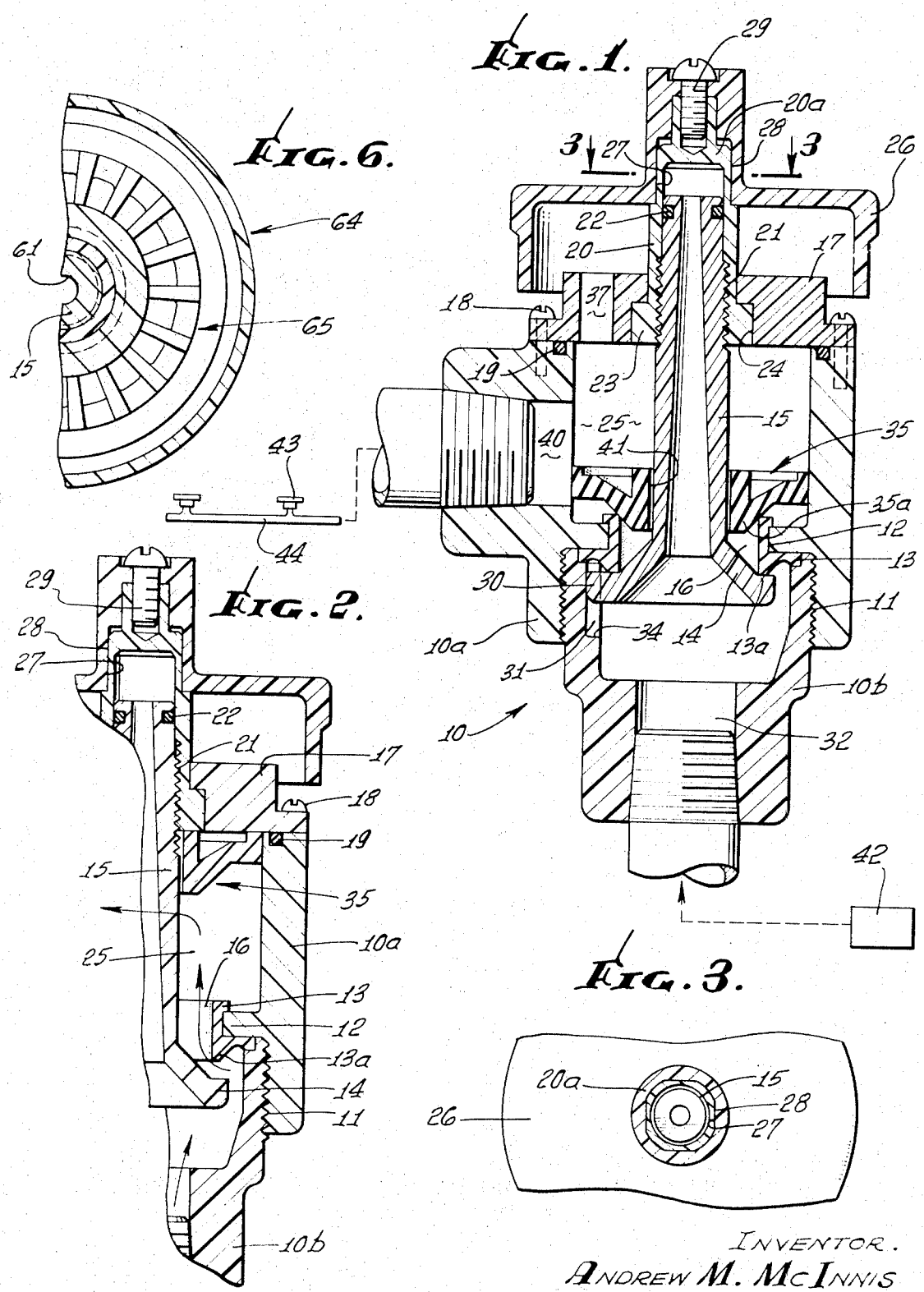

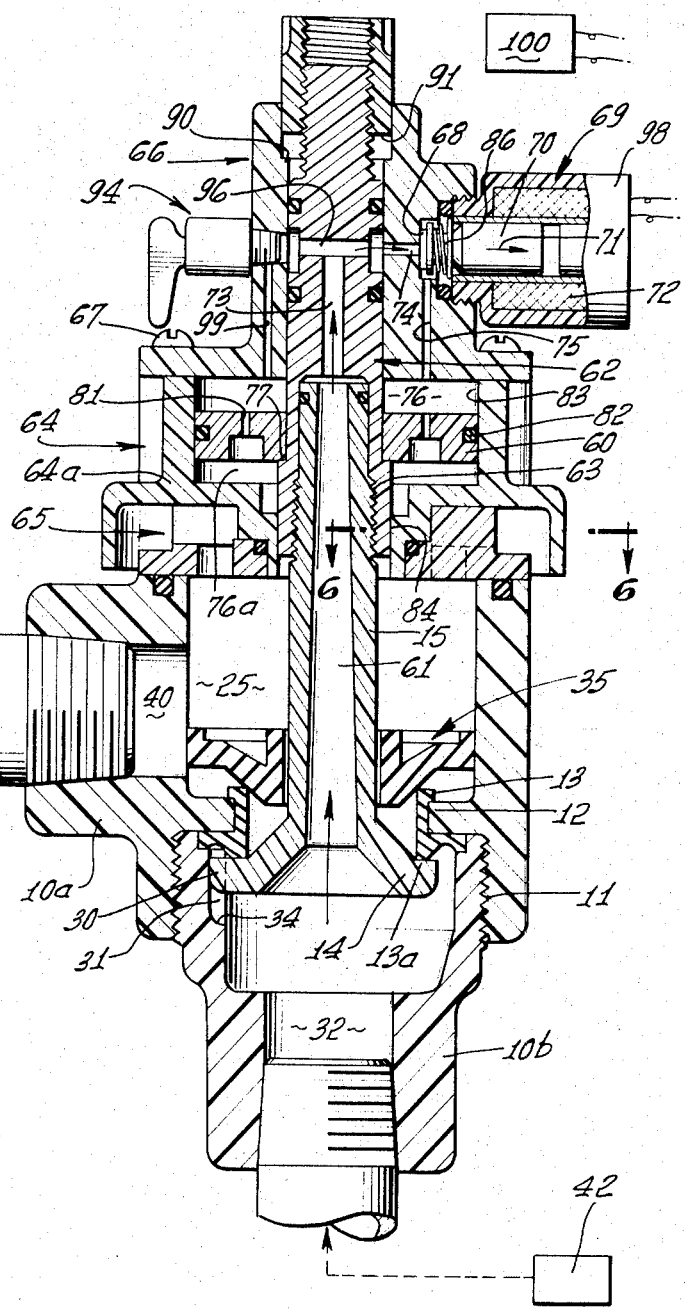

NON-LEAK VALVE OF PLASTIC CONSTRUCTION

BACKGROUND OF THE INVENTION

This invention relates generally to anti-siphoning shut-off valves, as are usable for example, in water sprinkler supply lines. More specifically, the invention concerns molded plastic valves of this type which are manually and/or automatically operable.

There are low-cost and weight advantages to be realized in utilizing light-weight, all-plastic construction valves for applications such as controlling water flow to lawn sprinklers. However, such valves are subject to substantially greater expansion and contraction (due to temperature change and water pressure application) than all metal valves, such expansion and contraction producing serious leakage problems. Further, no way was known to readily convert or adapt such all plastic valves to optional automatic control, with the advantages to be described herein. Accordingly, valves of such construction have not come into general usage.

SUMMARY OF THE INVENTION

It is a major object of the invention to provide a valve suitable for all plastic construction, and which will not leak due to such normal pressure and temperature changes as are encountered in water supply systems servicing lawn and garden equipment, and also safety sprinklers. It is another object of the invention to provide an anti-siphoning, shut-off valve of all plastic construction readily converted to, or adapted for, automatic control.

Basically, the valve comprises, in combination, a molded plastic body or chamber and an annular main seat therein, the chamber having an outlet; a stem projecting through the seat with clearance and a stopper carried by the stem to engage and disengage the seat at the side thereof opposite a body cap and in response to axial bodily displacement of the stem; and structure carried by the cap and carrying the stem to effect such axial displacement thereof. The chamber has an inlet to communicate liquid pressure to the stopper for transmitting pressure loading to the seat when the stem is axially displaced with consequent engagement of the stopper against the seat, whereby the stopper will remain closed against the seat irrespective of liquid pressure or temperature change induced expansion or contraction of the housing. Such structure may include a rotary sleeve having threaded connection with the stem, and an externally accessible rotary handle operatively connected with the sleeve. Also a tongue and groove connection between the stopper and body may block relative rotation therebetween in response to handle rotation of the sleeve to effect stem axial displacement. Almost all elements of the valve may consist of molded plastic material, as will appear.

In another form of the valve, converted to automatic operation, the stem displacing structure may include an actuator piston movable in response to reception of liquid pressure application to effect stem displacement in a direction to disengage the stopper from the seat. In addition, means is provided to control liquid pressure communication to the piston via a passage within the stopper and stem and to which liquid pressure at the inlet side of the seat has access. Such control means may be carried by the removable cap and include a control valve and solenoid actuator therefor. In addition, a pressure chamber may contain the actuator piston and be carried by the cap, with porting controlled by the control valve to controllably communicate liquid pressure via the passage in the stem to the piston in the pressure chamber. These elements (except for the solenoid) may also consist of molded plastic material, and may be constructed to interfit the stem and main body for conversion of a manually actuated valve to an automatically operated valve, as will be seen.

These and other objects and advantages of the invention, as well as the details of illustrative embodiments, will be more fully understood from the following description and drawings, in which:

DRAWING DESCRIPTION

FIG. 1 is a vertical section taken through one from of valve incorporating the invention, the stopper being closed;

FIG. 2 is a fragmentary vertical section taken through the FIG. 1 valve, showing the stopper in open position;

FIG. 3 is a fragmentary horizontal section taken on line 3—3 of FIG. 1;

FIG. 4 is a vertical section taken through another form of valve incorporating the invention, with stopper closed;

FIG. 5 is a fragmentary vertical section taken through the FIG. 4 valve, showing stopper in open condition; and FIG. 6 is a horizontal section taken on line 6—6 of FIG. 4.

DETAILED DESCRIPTION

In FIGS. 1 and 2, a molded plastic chamber 10 includes a main section 10a and an auxiliary tubular section 10b, the two sections having threaded interconnection at 11. An internal annular flange 12 on section 10a receives and carried a soft elastomer (rubber for example) annular main seat 13 annularly engageable at 13a by a plug or stopper 14, which may also consist of molded plastic material. The stopper 14 is carried by the central stem 15 projecting with clearance at 16 through the seat, and the stem may advantageously be tubular, for purposes as will appear.

Chamber 10 is shown to include a molded plastic cap 17 suitably removably fastened and sealed to the body section 10a as at 18 and 19 respectively. Structure is provided to be carried by the cap and to carry the stem to effect stem bodily displacement so as to cause the stopper to annularly engage and disengage the seat at the side thereof opposite the cap. Such structure may with unusual advantage include a molded plastic rotary sleeve 20 having threaded connection with the stem at 21. The stem periphery and sleeve bore are sealed off at 22, and an external flange 23 on the sleeve is received in a bore 24 in the cap so that the cap blocks sleeve displacement away from the interior 25 of the valve. Rotation may be imparted to the sleeve as from an externally accessible handle 26 having a bore defining flats 27 receiving the upper extent 20a of the sleeve, the latter also defining flats 28 engaging flats 27 as best seen in FIG. 3. A screw fastener 29 retains the handle on the sleeve, as shown in FIG. 1.

A tongue and groove connection at 30 and 31 between the stopper and body blocks relative rotation of the stopper in response to handle rotation of the sleeve 20, in order to effect the described axial bodily displacement of the stem and stopper. Tongue 30 projects outwardly from the stopper to fit in axial groove 31 formed by bodily section 10b.

With the handle 26 also having molded plastic construction, the valve as a whole may be considered to have light weight molded plastic construction especially well suited for lawn sprinkler control; also, it overcomes problems of leakage due to temperature change induced, or liquid pressure induced, expansion and contraction of the body or housing, or creep relaxation of loads imposed on these structures by other valve constructions. Thus, inlet fluid pressure communicated via inlet 32 to the stopper 14 is transmitted by the latter to the seat at 13a when the stopper is closed, whereby the stopper will remain closed against leakage despite such body expansion and contraction. Also water hammer will not dislodge seating of the valve. In this regard, inlet fluid pressure loading is transmitted via the stem 15, sleeve 20 and cap 17 to the body upper section 10a when the stopper is open, but expansion of the body or chamber is not then a problem. When the stem 15 is displaced to open the valve, stopper tongue 30 may be displaced downwardly against stop shoulder 34, to limit turning of the handles 26 in the opening direction.

A vacuum breaker ring 35 extends about the stem 15 at the side of the main seat opposite the stopper, to move between an up-position (FIG. 2) and down position (FIG. 1). In this regard, the cap 17 defines an air inlet passage 37 that is closed-off by the ring urged into up-position by the fluid pressure passed by the valve in stopper open condition. Note that the ring 35 may consist of molded plastic material.

In down position, as seen in FIG. 1, the ring partially seals off liquid flow through the gap 16 in reverse direction, i.e. from outlet 40 to inlet 32. In the event a vacuum is drawn by some abnormal means on the inlet side of the valve, this limits the transmission of forces associated with the flow of air to fill the vacuum, and insures that the air passages 37 in cap 17 can supply enough air to prevent a vacuum in the upper chamber 10a, preventing a backflow of liquid into the valve from the possibly contaminated outlet regions. This protects against contamination of community water supply lines. At such time, the ring annular projection 35a interfits between the stem and main seat, the ring having gravitated downwardly to engage and seal against the main seat at 13a. A slight clearance may be provided between the stem and ring at 41 to pass air to the inlet 32 in response to the vacuum application referred to, when there is no liquid flowing reversely into the main body interior 25 via the outlet 40. In this regard, water supply to the valve is indicated at 42, and sprinklers 43 are supplied from a pipe 44 connected with the valve. Ring or plug 35 gravitates into FIG. 1 position when the valve is closed.

The plastic parts referred to may consist of polyvinylchloride, polyoxymethylene, or other suitable plastic material, excepting that the ring may consist of pliable plastic such as rubber.

Referring now to FIG. 4 and 5, the elements within and below the chamber section 10a remain the same as in FIGS. 1 and 2, and therefore bear the same numbers. The structure to effect stem displacement here includes an actuator piston, as for example, is seen at 60, movable in response to liquid pressure application thereto to effect stem displacement in a direction to disengage the stopper 14 from the seat at 13a. Such structure also includes means to control liquid pressure application to the piston via passage 61 within the stopper and stem, and to which liquid pressure at the inlet side of the seat has access. In this regard, a central sleeve 62 receives the upper extent of the stem and is connected thereto as by threading at 63.

A pressure chamber 64 mounted on the cap 65 on body section 10a receives the piston 60 and central sleeve 62, and includes chamber section 64a and upper end cap 66, fasteners 67 removably retaining elements 64–66 on the body section 10a. Accordingly, these elements, the piston and control means to be described may easily be substituted onto the main valve in place of cap 17, sleeve 20 and handle 26 in FIG. 1.

The said means to control liquid pressure communication to the piston may with unusual advantage include a control valve or stopper 68 and a solenoid actuator therefor as at 69. The latter includes a plunger 70 carrying valve stopper 68 and movable endwise in the direction of arrow 71 in response to electrical energization of solenoid coil 72. At such time, fluid pressure passes from the stem passage 61, port 73 in the sleeve and port 74 in the cap 66 past the retracted valve stopper 68 and via port 75 in the cap to chamber 76. The piston is thus urged downwardly against sleeve shoulder 77, to displace the sleeve, stem and stopper downwardly to the position seen in FIG. 5. Accordingly, the main valve is opened and liquid flows therethrough as indicated by arrows 78–80. An orifice 81 through the piston slowly passes liquid from chamber 76a below the piston to chamber 76, to damp piston movement to down position, as well as opening of the main valve. Also, there is provision for slow leakage or "weeping" of liquid from chamber 76a via clearance at 84 to main valve interior 25. O-ring 82 seals off between the piston periphery and the bore 83 of the chamber 64.

When the solenoid is de-energized, return spring 86 urges the control stopper 68 to closed position blanking control port 74, as seen in FIG. 4. Liquid pressure acting upwardly on the stopper than displaces it, the sleeve 62 and piston 60 to up-position as seen in FIG. 4. During such upward displacement, liquid flow through orifice 81 damps the upmotion, and allows controlled upward movement of the piston, so that the main valve may open and close quietly and without creating water hammer problems.

It will be noted that when the sleeve is moved downwardly, a shoulder 90 on cap 66 is engageable by a shoulder 91 on the sleeve to limit down-stroking. Also, if manual opening of the valve is desired (say, in the event solenoid plunger 70 is stuck in open position), a pet-cock 94 may open a passage 99 connecting passage 96 with chamber 76, allowing the valve to open as with solenoid actuation.

As before, the cap 65, body 64, cap 66, sleeve 62, piston 60 and case 98 for the solenoid coil and plunger may consist of molded plastic material, as described above.

A sequence or timing controller for the valve solenoid is indicated at 100, for automatic control.

I CLAIM:
1. In a valve, the combination comprising
   a. a molded plastic chamber including a body and a cap removably carried thereby, there being an annular main seat in the body and a chamber outlet from the body,
   b. a stem projecting generally coaxially through the seat with clearance therefrom, and toward the cap at one side of the seat,
   c. a stopper carried by the stem to engage and disengage the seat at the opposite side thereof in response to axial bodily displacement of the stem,
   d. structure carried by the cap and carrying the stem to effect said displacement thereof, and
   e. the chamber having a liquid pressure inlet to communicate said pressure to the stopper for transmitting pressure loading to the seat when the stem is displaced with consequent engagement of the stopper against the seat, whereby the stopper will remain closed against the seat irrespective of liquid pressure or temperature change induced expansion or contraction of the housing,
   f. said structure including an actuator piston movable in response to liquid pressure application thereto to effect stem displacement in a direction to disengage the stopper from the seat, and means to control liquid pressure communication to said piston via a passage within the stopper and stem and to which liquid pressure at the inlet side of the seat has access.

2. The combination of claim 1 wherein said means is carried by the removable cap and includes a control valve and a solenoid actuator therefor.

3. The combination of claim 1 wherein said structure includes a sleeve receiving the stem and presenting a shoulder for engagement by the piston which extends annularly about the sleeve, there being a pressure chamber receiving the piston and carried by said cap and also containing porting controlled by the control valve to controllably communicate said pressure via the passage in the stem to the piston in the pressure chamber.

4. The combination of claim 3 including auxiliary means to reduce liquid pressure in said chamber.

5. The combination of claim 1 wherein said pressure chamber and piston consist of molded plastic material.

6. For combination with a main valve that includes a chamber body having an annular main seat therein and a chamber outlet, a stem projecting generally coaxially through the seat, and a stopper carried by the stem to engage and disengage the seat at a side thereof communicating with an inlet defined by the body, and in response to stem axial displacement, the improvement comprising:
   a. an annular cap connectible to the body to generally coaxially align with the stem, and
   b. structure carried by the cap and connectible with the stem to effect said stem displacement, said structure including an annular actuator piston movable in response to liquid pressure application thereto to effect stem displacement in a direction to disengage the stopper from the seat, and
   c. said structure also including means to control liquid pressure communication to said piston via a passage within the stopper and stem and to which liquid pressure at the inlet side of the seat has access.

7. The improvement of claim 6 wherein said means includes a control valve and solenoid actuator therefor.

8. The improvement of claim 6 wherein said structure includes an actuator piston movable in response to liquid pressure application thereto to effect stem displacement in a direction to disengage the stopper from the seat, and means to control liquid pressure communication to said piston via a passage within the stopper and stem and to which liquid pressure at the inlet side of the seat has access.

9. The improvement of claim 8 wherein said pressure chamber and piston consist of molded plastic material.

10. The improvement of claim 6 wherein said cap contains an anti-siphon through port.

* * * * *